United States Patent [19]

Ledebuhr et al.

[11] Patent Number: 4,836,649
[45] Date of Patent: Jun. 6, 1989

[54] OPTICAL LAYOUT FOR A THREE LIGHT VALVE FULL-COLOR PROJECTOR EMPLOYING A DUAL RELAY LENS SYSTEM AND A SINGLE PROJECTION LENS

[75] Inventors: Arno G. Ledebuhr, Fullerton; Donald E. Sprothbery, Orange, both of Calif.

[73] Assignee: Hughes Aircraft Company, Los Angeles, Calif.

[21] Appl. No.: 754,799

[22] Filed: Jul. 19, 1985

[51] Int. Cl.$^4$ ............................................. G02F 1/13
[52] U.S. Cl. ................................ 350/331 R; 350/573; 350/574; 350/173; 350/174; 353/31
[58] Field of Search .............. 350/164, 173, 176, 573, 350/574, 350 S, 342, 331 R; 358/231, 225, 240, 250, 55, 224, 227; 353/31, 34, 37, 32, 119, 99

[56] References Cited

U.S. PATENT DOCUMENTS

| | | | |
|---|---|---|---|
| 2,632,370 | 3/1953 | Shepard | 358/55 X |
| 2,743,648 | 5/1956 | Parker | 358/225 X |
| 3,326,620 | 6/1967 | Marie | 350/573 |
| 3,381,084 | 6/1964 | Wheeler | 358/55 |
| 3,409,354 | 6/1966 | Frank | 355/49 |
| 3,451,752 | 6/1969 | Frank | 350/445 X |
| 3,536,434 | 10/1970 | Frank | 350/574 X |
| 3,914,787 | 10/1975 | Canon | 358/50 |
| 4,127,322 | 11/1978 | Jacobson et al. | 353/31 |
| 4,191,456 | 3/1980 | Hong et al. | 350/342 |
| 4,251,129 | 2/1981 | Canon | 350/91 |
| 4,295,159 | 10/1981 | Carollo et al. | 358/22 |
| 4,331,390 | 5/1982 | Shafer | 350/444 |
| 4,425,028 | 1/1984 | Gagnon et al. | 350/337 |
| 4,461,542 | 7/1984 | Gagnon | 350/331 R |
| 4,464,018 | 8/1984 | Gagnon | 352/342 X |
| 4,464,019 | 8/1984 | Gagnon | 350/331 R |
| 4,591,886 | 5/1986 | Umeda et al. | 350/350 S |

FOREIGN PATENT DOCUMENTS

| | | |
|---|---|---|
| 0083090 | 7/1983 | European Pat. Off. |
| 0083440 | 7/1983 | European Pat. Off. |
| 0120216 | 7/1983 | Japan ............................... 350/173 |
| 0463863 | 9/1934 | United Kingdom ............... 358/231 |
| 1207282 | 9/1970 | United Kingdom ............... 358/55 |

OTHER PUBLICATIONS

Jenkins et al. "The Effects of Stops", *Fundamentals of Optics* McGraw-Hill Book Company, Inc. 1950, pp. 94—111.

Primary Examiner—S. D. Miller
Assistant Examiner—Napoleon Thantu
Attorney, Agent, or Firm—A. W. Karambelas

[57] ABSTRACT

A liquid crystal light valve projector is disclosed which includes source illumination appratus which images an illumination aperture at the liquid crystal light valves, and further includes light valve imaging apparatus for relaying the light valve images to a wide angle projection lens having a short back focal length. The disclosed liquid crystal light valve projector utilizes air separated dichroic color separator for providing primary color illumination to the light valves.

12 Claims, 2 Drawing Sheets

OPTICAL LAYOUT FOR A THREE LIGHT VALVE FULL-COLOR PROJECTOR EMPLOYING A DUAL RELAY LENS SYSTEM AND A SINGLE PROJECTION LENS

BACKGROUND OF THE INVENTION

The disclosed invention generally relates to liquid crystal light valve projectors, and is particularly directed to a liquid crystal light valve projector having an optical relay for imaging illumination at the light valves and an optical relay for imaging the light valve images.

The development of liquid crystal light valve (LCLV) technology has resulted in the development of large screen projectors which utilize one or more LCLV's to modulate the light being projected. The LCLV's are selectively modulated by respective appropriate apparatus such as cathode ray tubes (CRT's).

Color liquid crystal light valve projectors typically include color separating apparatus such as prisms or beamsplitters for separating white light into the three primary color bands; namely, red, green, and blue light components. The red, green, and blue components are individually modulated by respective light valves for projection. Examples of color LCLV projectors are set forth in U.S. Pat. No. 4,425,028, issued to R. J. Gagnon et al. on Jan. 10, 1984, and assigned to the assignee of this application; and in U.S. Pat. No. 4,461,542, issued to R. J. Gagnon on July 24, 1984, and also assigned to the assignee of the subject application.

Some known full color liquid crystal light valve projectors tend to be large in order to enclose the optical elements. For example, particular optical arrangements utilize both axes of polarization which requires placement of CRT light valve assemblies in different planes. Some optical arrangements may require larger optical elements or greater spacing between elements, which requirements may be in addition to the CRT light valve placement requirements. Regardless of the reason for size, if the LCLV projector is too large it may be inappropriate in applications where space is a premium, such as shipboard applications.

In addition to size considerations, the use of both axes of polarization is generally characterized by reduced contrast. The use of both axes of polarization may be an important consideration in some applications such as display systems generally known as "in-line infinity" display systems or "pancake window" display systems. In-line infinity display systems include polarizing elements and provide better transmission efficiency when illuminated with light having a single axis of polarization. Illumination with polarized light having both axes of polarization or with unpolarized light would result in a substantial amount of light being removed by a polarizer. Examples of in-line infinity display systems are referenced in a Farrand Optical Co., Inc. brochure M-129B, November 1974.

A further characteristic of known liquid crystal light valve projectors is the typical utilization of illumination optics which provide image magnification to achieve the necessary telecentric illumination of the liquid crystal light valves. Such magnifying illumination optics may be less efficient and tend to impose limitations on the design of other elements of the projector, including the color separating apparatus.

Some known full-color liquid crystal light valve projectors utilize complex color separating apparatus which include optical grade oil as a refractive medium. The use of such oil requires the consideration of possible leakage, high cost, additional complexity, and increased weight. Also, some optical tanks require a particular orientation for proper operation.

SUMMARY OF THE INVENTION

It would therefore be an advantage to provide a liquid crystal light valve projector which is compact and occupies a small volume.

It would also be an advantage to provide a liquid crystal light valve projector which is compact and utilizes only a single axis of polarization.

Another advantage would be to provide a liquid crystal light valve projector which is compact, provides high system efficiency, and utilizes a single axis of polarization.

Still another advantage would be to provide a liquid crystal light valve projector having an efficient illumination system which is readily adapted for different packaging requirements.

A further feature would be to provide a liquid crystal light valve projector which includes an illumination lens relay for illuminating the liquid crystal light valves, which allows for more flexibility in the location of the illumination structure, the polarizing elements, and/or the color separating apparatus.

It would also be an advantage to provide a liquid crystal light valve projector which includes an illumination lens relay and a light valve image lens relay wherein both lens relays utilize a lens that is common to both relays.

A further advantage would be to provide a liquid crystal light valve projector which does not require a fluid filled color separating system.

The foregoing and other advantages and features are provided in a liquid crystal light valve projector which includes illumination apparatus for providing an illumination aperture; relay optics for imaging the illumination aperture; polarizers cooperating with the illumination relay optics for providing a first light beam having a first polarization state; color separating apparatus responsive to the first light beam for providing respective light beams having first, second, and third colors; and first, second, and third optical modulators for respectively modulating the light beams having first, second, and third colors to provide polarization modulated illumination. A further feature of the disclosed liquid crystal light valve projector is directed to a light valve imaging relay which includes projection relay optics cooperating with the illumination relay optics to relay an image of the liquid crystal light valves to the back focal plane of a wide angle projection lens having a short back focal length, thereby attaining good optical performance.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION

Figure 1:
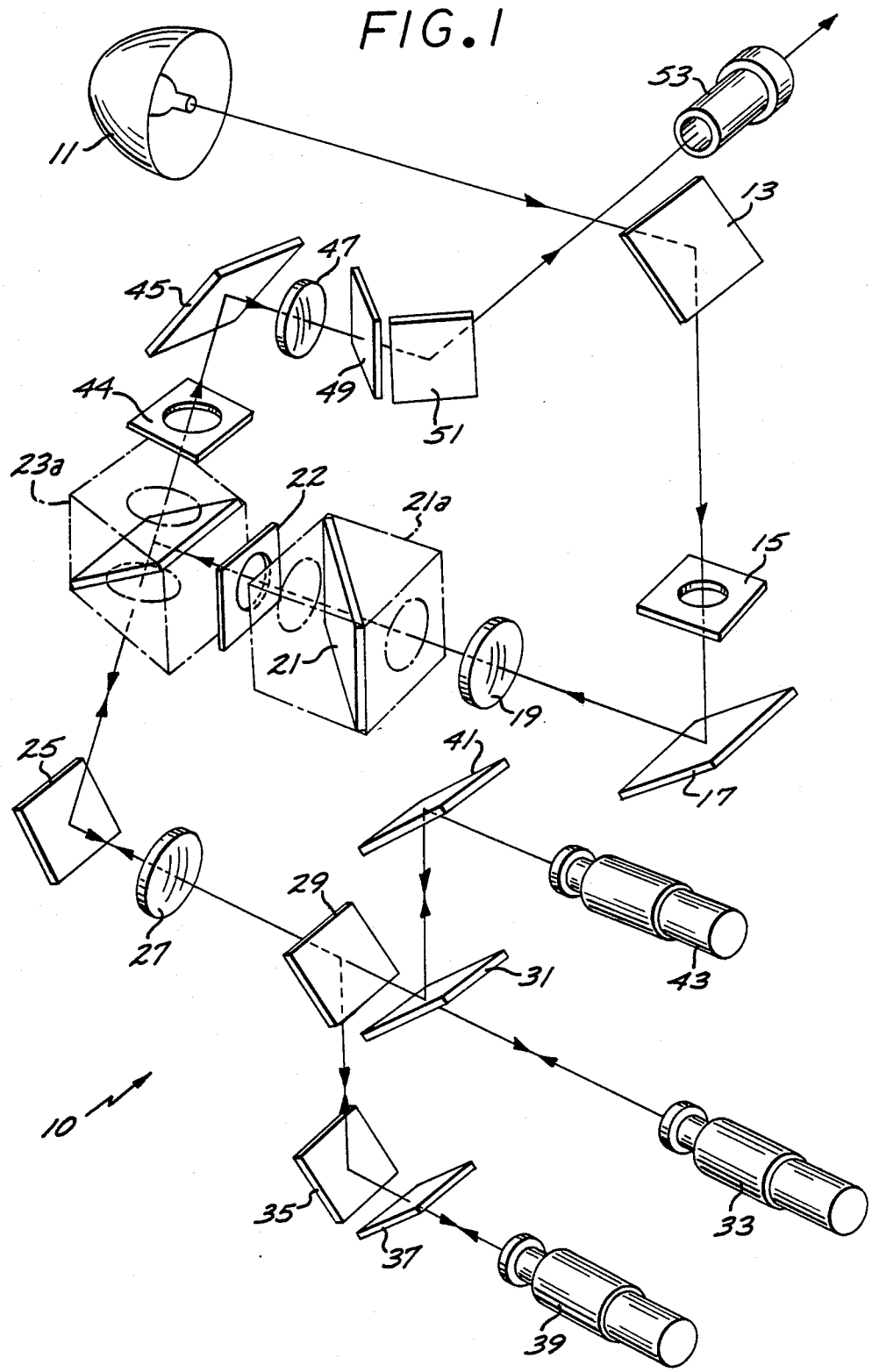
FIG. 1 is a schematic perspective view of the liquid crystal light valve projector of the invention.

In the following detailed description and in the several figures of the drawing, like elements are identified with like reference numerals. Also, the figures are not drawn to scale.

Referring now to FIG. 1, shown therein is a liquid crystal light valve (LCLV) projector 10 which includes an arc lamp illumination source 11 which provides unpolarized white light to a cold mirror 13. As is well known, a cold mirror reflects visible light and transmits radiation in the infrared region. The cold mirror 13 particularly functions to redirect the unpolarized white light from the illumination source 11 and to remove heat from such light. The light reflected from the cold mirror 13 is directed to an illumination aperture 15. The light passing through the aperture 15 impinges upon another cold mirror 17 which directs the reflected white light to a relay lens 19 which is of an appropriate lens structure although shown as a simple lens for ease of illustration.

The relay lens 19 illuminates a prepolarizer 21 which transmits polarized light that is P polarized relative to the prepolarizer 21. The polarized light transmitted by the prepolarizer 21 of the MacNeille type illuminates an aperture stop 22. The light passing through the aperture stop 22 illuminates a polarizer/analyzer 23, also of the MacNeille type, which reflects S polarized light. Relative to the polarizer/analyzer 23, the polarized light from the prepolarizer 21 is S polarized and is therefore reflected. The aperture stop 22 is equidistant between the prepolarizer 21 and the polarizer/analyzer 23.

For better performance, the prepolarizer 21 and the polarizer/analyzer 23 preferably are mounted within respective fluid filled housings 21a, 23a which contain index matching optical fluid. Alternatively, both may be mounted in a single index matching optical fluid filled housing.

A front surface fold reflector 25 directs the S polarized light (P polarized light as defined in connection with prepolarizer 21) to a further relay lens 27 along an illumination axis IA. The relay lens 27 is of an appropriate lens structure although shown as a simple lens for ease of illustration.

Figure 2:
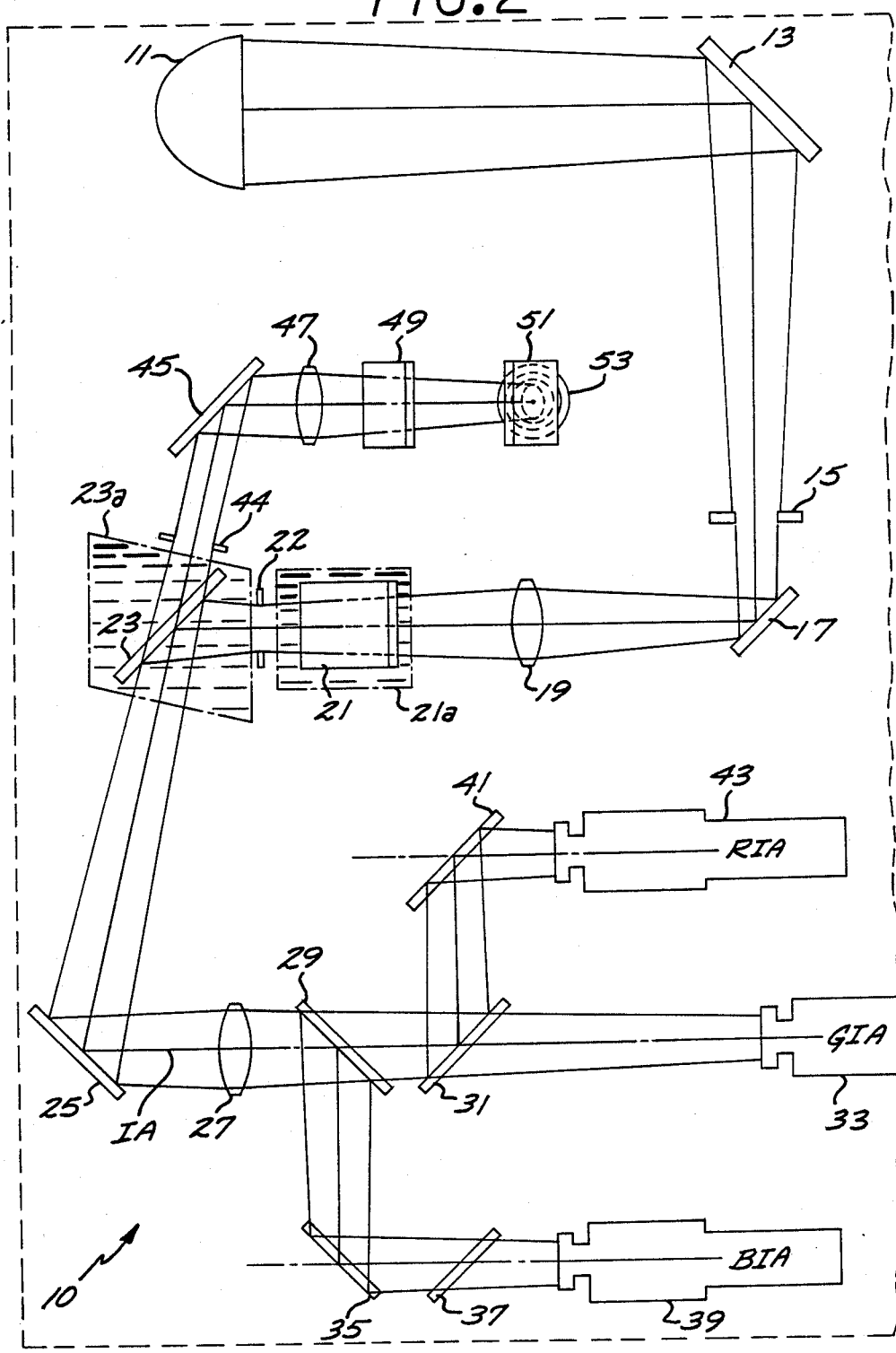
FIG. 2 is a schematic elevational view of the liquid crystal light valve projector of FIG. 1.

The relay lens 27 illuminates a blue dichroic separator 29 which reflects the blue portion of the incident light and transmits the remaining portion. In this case, the remaining portion includes the red and green portions of the incident light. The plane of the blue dichroic separator 29 is positioned at forty-five degrees relative to the illumination axis IA and is perpendicular to the plane of FIG. 2.

The light transmitted through the blue dichroic separator 29 illuminates a red dichroic separator 31, the plane of which is positioned at ninety degrees relative to the plane of the blue dichroic separator 29 and at forty-five degrees relative to the illumination axis IA. The red dichroic separator 31 reflects the red portion of the incident light and transmits the remaining portion, which in this case is the green portion of the incident light, along a green illumination axis GIA which is colinear with the illumination axis IA. The transmitted green light illuminates the light valve of a cathode ray tube (CRT) light valve assembly 33. As is well known, the CRT light valve assembly 33 provides reflected light which is polarization modulated. The CRT light valve assembly 33 modulates the green portions of the image for projection.

A back surface fold reflector 35 is in a plane parallel to the plane of the blue dichroic separator 29 and directs the blue light along a blue illumination axis BIA which is parallel to the illumination axis IA. The blue light passes through a compensating plate 37, which is in a plane parallel to the plane of the red dichroic separator 31 and compensates for the optical effects of the separator 31, and illuminates the light valve of a CRT light valve assembly 39. The CRT light valve assembly 39 modulates the blue portions of the image for projection.

A back surface fold reflector 41 is in a plane parallel to the plane of the red dichroic separator 31 and directs the red light along a red illumination axis RIA which is parallel to the green illumination axis GIA and to the blue illumination axis BIA. The light valve of a CRT light valve assembly 43 receives the red light, and modulates the red portions of the image for projection.

The light valves of the CRT light valve assemblies 33, 39, 43 are optically aligned with the respectively associated green illumination axis GIA, blue illumination axis BIA, and red illumination axis RIA so that the respective imaging illumination reflected by the three CRT light valve assemblies will be directed along such respective axes. As referenced above, such axes are parallel. Preferably, such axes are also coplanar.

The green polarization modulated imaging light reflected by the CRT light valve assembly 33 passes back through the red dichroic separator 31 and is combined with the red polarization modulated imaging light reflected by the CRT light valve assembly 43 as the red dichroic separator 31. The combined red and green imaging light passes through the blue dichroic separator 29 where they are combined with the blue polarization modulated imaging light reflected by the CRT light valve assembly 39.

The combined red, green, blue (RGB) polarization modulated imaging light passes back through the relay lens 27 and is reflected by the fold reflector 25 to the polarizer/analyzer 23. The P polarized light of the RGB imaging light is transmitted by the polarizer/analyzer 23 and illuminates an aperture stop 44. The light passing through the aperture stop 44 illuminates a front surface fold reflector 45. A lens 47 receives the light reflected by the reflector 45 and provides illumination which passes through a compensating plate 49 to a back surface fold reflector 51. Together the compensating plate 49 and the reflector 51 compensate for the optical effects of the blue dichroic separator 29 and the red dichroic separator 31. The light reflected by the fold reflector 51 is transmitted through a single projection lens 53 to an appropriate screen (not shown). The relay lenses 27 and 47 cooperates as an imaging system for relaying to and focusing the combined RGB image of the light valves at the back focal plane of the projection lens 53.

The color separating elements including the polarizers, the dichroic color separators, and the compensating plates are optically coupled by air.

The blue dichroic reflector 29, the red dichroic reflector 31, the compensating plate 37 and the compensating plate 49 are each the same thickness, while the back surface reflectors 35, 41, and 51 are each one-half of such thickness. The compensating plates 37, 49, and the back surface reflectors 35, 41, 51 are provided so that the red, green, and blue light respectively travel substantially identical optical paths.

In the foregoing liquid crystal light valve projector 10, the relay lenses 19 and 27 cooperate as an illumination imaging system for relaying an image of the illumination aperture 15 to each of the light valve assemblies 33, 39, 43. Preferably, the lenses 19 and 27 provide a one-to-one imaging ratio.

As mentioned previously, the relay lenses 27 and 47 cooperate as a light valve imaging system for relaying to and focusing the combined RGB image of the light valves to the back focal plane of the projection lens 53. Preferably, the lenses 27 and 47 also provide a one-to-one imaging ratio. With the disclosed relay lens imaging of the RGB light valve images, a wide angle lens having a short back focal length is advantageously utilized as the projection lens 53. A wide angle projection lens with a short back focal length can have much better performance than lenses having longer back focal lengths.

The foregoing has been a description of a liquid crystal light valve projector which provides several advantages and features.

As an advantage of utilizing a single axis of polarization, all colors are polarized which provides for improved contrast and higher system efficiency.

As an advantage of the illumination aperture relay and the light valve image relay, the illumination and projection paths may be folded in different ways (which may require fewer or more fold reflectors) as appropriate for desired packaging. Moreover, such relays allow for flexibility in the design and location of the illumination structure and the color separating apparatus.

The preferred one-to-one relay lens imaging systems provide several advantages. The prepolarizer 21 and the polarizer/analyzer 23 may be centrally located in the optical paths where the illumination bundles are narrowest. Specifically, the prepolarizer 21 and the polarizer/analyzer 23 may be located in the proximity of the respective aperture stops 22, 44 for the respective illumination aperture image and light valve image optical paths. Thus, the dimensions of the prepolarizer 21 and the polarizer/analyzer 23 can be minimized. An important advantage of the one-to-one lens relay is that the prepolarizer 21 and the polarizer/analyzer 23 will provide optimum performance since the incident angle range for the incident illumination is small with the one-to-one lens relays. Further, the illumination aperture image lens relay and the light valve image lens relay advantageously include a lens which is common to both lens relays.

As a further advantage of the one-to-one illumination relay, the illumination aperture is comparable in size to each of the liquid crystal light valves, which allows for more efficient use of the source illumination. Also, the one-to-one illumination relay allows the prepolarizer to be located away from the heat producing source illumination, thereby avoiding stress birefringence.

As an advantage of the disclosed color separating apparatus having elements separated by air, simplification over index matching filled optical tanks is attained.

As a result of the above and other advantages and features, the disclosed liquid crystal light valve projector provides improved performance, high projected image contrast, high system efficiency, and may be efficiently and compactly packaged to meet a variety of the space limitations.

Although the foregoing has been a description and illustration of specific embodiments of the invention, various modifications and changes thereto can be made by persons skilled in the art without departing from the scope and spirit of the invention as defined by the following claims.

What is claimed is:
1. A liquid crystal light valve image projection system comprising:
 (a) an illumination source for providing unpolarized white light;
 (b) polarizing means disposed in the path of said unpolarized light, said polarizing means including a prepolarizer for transmitting light of a first polarization and reflecting light of a second polarization away from the optical path of the transmitted light of said first polarization, said polarizing means further including a polarizer/analyzer for reflecting light of said first polarization and transmitting light of said second polarization, said polarizer/analyzer being disposed in the optical path of the transmitted light from said prepolarizer;
 (c) relay lens means for relaying images along the optical path of said image projection system;
 (d) projection optics for projecting image data; and
 (e) light valve means disposed in the optical path of the polarized light that is reflected by said polarizer/analyzer, said light valve means modulating the polarization state of the light reflected by said polarizer analyzer and reflecting polarization-modulated light back along the optical path of the polarized light that is reflected by said polarizer/analyzer, said polarization-modulated light that is reflected by said light valve being being passed by said polarization/analyzer to said projection optics.

2. A liquid crystal light valve image projection system as recited in claim 1 wherein said relay lens means includes:
 (a) a first relay lens disposed in the path of said unpolarized light between said illumination source and said polarizing means; and
 (b) a second relay lens disposed in the path of the polarized light reflected by said polarizer/analyzer, and
 (c) a third relay lens disposed between said polarizer/analyzer means and said projection optics on the optical path of the polarization-modulated light.

3. A liquid crystal light valve image projection system as recited in claim 2 further comprising:
 (a) means for extracting light of a first color from said polarized light that is reflected by said polarizer/analyzer and directing said light of a first color onto a first optical path;
 (b) means for extracting light of a second color from said polarized light that is reflected by said polarizer/analyzer and directing said light of a second color onto a second optical path; and wherein said light valve means includes:
 (c) a first liquid crystal light valve disposed in the first optical path of the light of said first color; and
 (c) a second liquid crystal light valve disposed in the second optical path of the light of said second color.

4. A liquid crystal light valve image projection system as recited in claim 2 further comprising:
 (a) means for extracting light of a first color from said polarized light that is reflected by said polarizer/analyzer and directing said light of a first color onto a first optical path;
 (b) means for extracting light of a second color from said polarized light that is reflected by said polarizer/analyzer and directing said light of a second color onto a second optical path; and (c) light of a third color being transmitted onto a third optical path; and wherein said light valve means includes:
(a) a first liquid crystal light valve disposed in the first optical path of the light of said first color;
(b) a second liquid crystal light valve disposed in the second optical path of the light of said second color; and
(c) a third liquid crystal light valve disposed in the third optical path of the light of said third color.

5. A liquid crystal light valve image projection system as recited in claim 4 wherein said first optical path, said second optical path and said third optical path are parallel.

6. A liquid crystal light valve image projection system as recited in claim 5 wherein said first optical path, said second optical path and said third optical path are in the same plane.

7. A liquid crystal light valve image projection system as recited in claim 3 further including:
(a) an aperture stop disposed between said prepolarizer and said polarizer/analyzer on the path of said transmitted light of said first polarization.

8. A liquid crystal light valve image projection system as recited in claim 7 further including:
(a) an aperture stop disposed between said illumination source and said first relay lens; and
(b) an aperture stop disposed between said polarizer/analyzer and said third relay lens.

9. A liquid crystal light valve image projection system as recited in claim 8 wherein said prepolarizer and said polarizer/analyzer are of the MacNeille type.

10. A liquid crystal light valve image projection system as recited in claim 2 further including:
(a) an aperture stop disposed between said prepolarizer and said polarizer/analyzer on the path of said transmitted light of said first polarization.

11. A liquid crystal light valve image projection system as recited in claim 10 further including:
(a) an aperture stop disposed between said illuminations source and said first relay lens; and
(b) an aperture stop disposed between said polarizer/analyzer and said third relay lens.

12. A liquid crystal light valve image projection system as recited in claim 11 further comprising:
(a) means for extracting light of a first color from said polarized light that is reflected by said polarizer/analyzer and directing said light of a first color onto a first optical path;
(b) means for extracting light of a second color from said polarized light that is reflected by said polarizer/analyzer and directing said light of a second color onto a second optical path;
(c) light of a third color being transmitted onto a third optical path; and wherein said light valve means includes:
(d) a first liquid crystal light valve disposed in the first optical path of the light of said first color;
(e) a second liquid crystal light valve disposed in the second optical path of the light of said second color; and
(f) a third liquid crystal light valve disposed in the third optical path of the light of said third color.

* * * * *